Patented Feb. 16, 1932

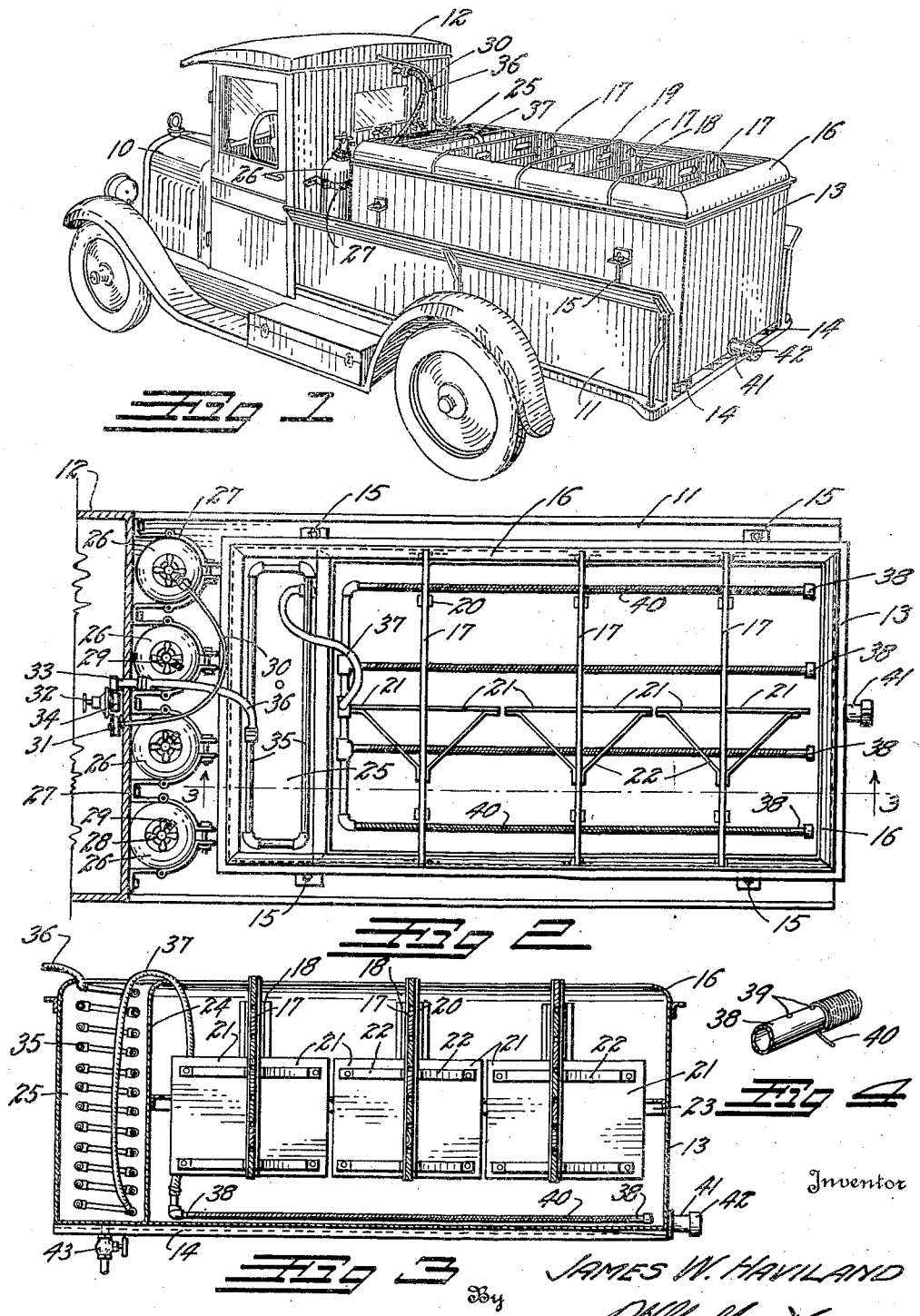

1,845,599

UNITED STATES PATENT OFFICE

JAMES W. HAVILAND, OF DENVER, COLORADO

TANK FOR TRANSPORTING LIVE FISH

Application filed April 5, 1929. Serial No. 352,758.

This invention relates to means for transporting live fish. It is more particularly designed for use by fish hatcheries in transporting the small fish for stocking streams, lakes, etc. It is the present custom to transport the fish from the hatchery in cans similar to large milk cans. Only a relatively small number of fish can be placed in each can and owing to railroad rules but a limited number of cans can be carried in a baggage car. It has therefore become a vital problem to transport the fish from the hatcheries to the stream. Some of the larger hatcheries hatch considerably over a million fish in a season and to transport a million fish in cans is a physical impossibility.

The principal object of this invention is to provide a tank and vehicle in which several thousand fish can be transported over relatively long distances without injury to the fish.

To transport a large volume of water in an open tank on a rapidly moving vehicle presents a problem. The vehicle in rapidly starting and stopping will tend to cause the water to surge to the forward or rearward extremities of the tank causing an overflow. A further object of the invention is to provide a tank with means which will prevent the surging of the water caused by the varying speeds and vibration of the vehicle.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a perspective view of the complete invention as applied to a motor truck.

Fig. 2 is a plan view of the tank portion thereof, with the truck cab shown in section.

Fig. 3 is a longitudinal vertical section through the tank, taken on the line 3—3, Fig. 2.

Fig. 4 is a detail view illustrating the construction of the oxygen distributing pipes.

Construction

In the drawings a motor vehicle is designated in its entirety by the numeral 10 with its body at 11 and cab at 12. The fish containing portion of the invention comprises a preferably rectangular tank 13 of a size to substantially fill the vehicle body 11. The tank 13 is supported within the body upon longitudinal channel irons 14 and is secured therein by means of stay bolts 15. The entire upper edge of the tank 13 is rolled or turned inwardly as shown at 16 so as to throw any splashing water inwardly into the tank. A discharge nipple 41 closed by means of a cap 42, or any suitable valve is provided for discharging the contents of the tank 13.

To prevent the water from surging forward and rearward within the tank, lateral splash boards 17 are provided. The splash boards slide between vertical guides 18 on the sides of the tank and are provided with hand holes 19 by means of which they may be lifted from the tank. The inwardly turned edge 16 is slotted at each of the splash boards to allow withdrawal thereof.

The splash boards 17 each comprise a vertical series of spaced apart wooden boards held together by means of bands 20 secured thereto. Each splash board carries a pair of oppositely projecting splash plates 21 which are maintained at right angles to the splash boards by means of suitable braces 22.

When the splash boards are in position in the tank they are supported above the bottom thereof, as indicated in Fig. 3, by an inner stiffening angle member 23 which surrounds the entire inner walls of the tank. When in position the splash plates 21 all align with each other, as shown in Fig. 2, substantially along the center line of the tank.

Adjacent the forward end of the tank 13 a cross partition 24 is placed so as to form an ice compartment 25 within the tank 13. Between the tank 13 and the cab 12 a series of oxygen bottles 26 are secured by means of hinged clamps 27. The bottles 26 are of the usual design for holding compressed gases and are provided with suitable valves 28 and discharge nipples 29.

A high pressure pipe 30 is arranged so that it may be connected with any desired one of the nipples 29 and leads to a high pressure gauge 31 and a pressure reducing valve 32 positioned within the cab 12. The gauge and reducing valve assembly may be any of the usual designs at present on the market for reducing gas pressure, such as commonly employed in oxy-acetelene operations. From the reducing valve 32 the gas is conveyed to a discharge nipple 33, which communicates with a low pressure gauge 34.

From the nipple 33 the gas flows to a cooling coil 35 within the ice chamber 25 through a flexible hose 36. From the cooling coil 35 the gas discharges through a second flexible hose 37 to a series of oxygen supply pipes 38 positioned in the bottom of the tank 13. The oxygen supply pipes are provided with spaced perforations 39, as indicated in Fig. 4, and are wrapped with any suitable porous medium such as a cotton string 40.

*Operation*

In use, the tank 13 is filled with water with the fish therein and the ice compartment 25 is filled with chopped ice. Oxygen, from one of the bottles 26, is turned on by means of the reducing valve 32. The operator in the cab 12 can, by means of the gauges 31 and 34, note the amount of oxygen which is discharging into the tank and can also note the amount of oxygen remaining in the particular oxygen bottle being discharged. When one bottle is empty he can attach the pressure tube 30 to a full bottle until all of the bottles have been emptied.

The oxygen will pass through the cooling coil 35 and become chilled because of the surrounding ice. It will then pass into the distributing pipes 38, through the perforations 39 and disperse through the wrapped string 40 into the water. The string breaks the oxygen in minute bubbles so that it will be absorbed by the water and will not float to the top and become lost.

The oxygen serves a double purpose; first, it provides the necessary life giving element to the water and, second, it acts to evenly and uniformly chill or cool the water. The oxygen expanding through the reducing valve 32 will in itself be chilled and will be additionally cooled by the cooling coil 35 so that when it discharges it will be exceedingly cold. The cold partition 24 also assists in chilling the water.

When the motor vehicle 10 comes to a sudden stop the water in each compartment between the splash boards 20 will tend to move forwardly against the splash boards, this prevents a surge from passing through the entire tank and forcing the water over the forward extremity thereof. Side surges caused by the rolling of the vehicle or turning corners are absorbed by the splash plates 21. Surface wave splashes are absorbed and thrown inwardly by the turned edge 16 so that they will not splash over the edge of the tank. The entire top of the tank may be covered by any suitable canvas covering, or the like, (not shown) to protect the fish from the sun.

At the terminus of the trip the splash boards 20 are lifted from the tank and the fish bailed therefrom or in some instances the entire contents of the tank, fish and all, can be discharged through the niple 41 into the stream.

The supporting of the splash boards above the bottom of the tank serves a double purpose. First it prevents the fish from being crushed against the bottom of the tank when the boards are put in place therein. Second, the fish naturally remain in the bottom of the tank adjacent the oxygen pipes and by eliminating the partitions at this point the loss of fish by being bruised against the partitions during sudden stops and starts is eliminated.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. A tank for transporting fish comprising: an open topped tank; inwardly turned edges about said open topped tank so as to force waves inwardly therein; splash boards laterally arranged in said tank; and splash plates projecting substantially at right angles to and supported above the bottom of said tank by said splash boards.

2. In a portable fish tank having an open top, means for preventing waves from splashing over said top comprising: inwardly turned edges extending around the periphery of said tank so as to throw any splashing water inwardly into said tank; and a series of lateral splash boards slidably maintained in said tank, and projections extending inwardly from the walls of said tank and adapted to support said splash boards above the bottom thereof.

3. In a portable fish tank having an open top, a series of lateral splash boards slidably mounted in said tank and projections extending inwardly from the walls of said tank and adapted to support said splash boards above the bottom thereof.

In testimony whereof, I affix my signature.

JAMES W. HAVILAND.